(12) United States Patent
Workman, Jr. et al.

(10) Patent No.: US 10,054,483 B1
(45) Date of Patent: Aug. 21, 2018

(54) MICROMIRROR SPECTROPHOTOMETER ASSEMBLY

(71) Applicant: WESTCO SCIENTIFIC INSTRUMENTS, INC, Brookfield, CT (US)

(72) Inventors: Jerome J. Workman, Jr., Marlborough, MA (US); John Coates, Newtown, CT (US); David Naranjo, Dracut, MA (US)

(73) Assignee: WESTCO SCIENTIFIC INSTRUMENTS, INC, Brookfield, CT (US)

( * ) Notice: Subject to any disclaimer, the term of this patent is extended or adjusted under 35 U.S.C. 154(b) by 0 days.

(21) Appl. No.: 15/610,998

(22) Filed: Jun. 1, 2017

(51) Int. Cl.
   *G01J 3/28* (2006.01)
   *G01J 3/02* (2006.01)
   *G01J 3/18* (2006.01)

(52) U.S. Cl.
   CPC .............. *G01J 3/021* (2013.01); *G01J 3/18* (2013.01); *G01J 3/28* (2013.01); *G01J 2003/2866* (2013.01)

(58) Field of Classification Search
   CPC ........ G01J 3/02; G01J 3/18; G01J 3/12; G01J 3/28; G01J 3/10
   See application file for complete search history.

(56) References Cited

U.S. PATENT DOCUMENTS

2007/0229821 A1* 10/2007 Christian ................. G01J 3/02
                                                                      356/317

* cited by examiner

*Primary Examiner* — Abdullahi Nur
(74) *Attorney, Agent, or Firm* — Thomas | Horstemeyer, LLP; N Andrew Crain; Jason M. Perilla

(57) ABSTRACT

Aspects of a micromirror spectrophotometer assembly are described. In one example case, an instrument includes a diffraction grating to disperse broadband light over a range of wavelengths, a detector, a digital micromirror device (DMD) configured to scan through and reflect at least a portion of the range of wavelengths toward the detector, and a base platform having a number of integrally formed assembly mounts. The assembly mounts are formed to align and secure the diffraction grating, the detector, the DMD, and other optical components of the instrument in a predetermined arrangement. The instrument can also include a reference paddle having a reference material for calibration of the instrument, and a rotatable sample tray to rotate a sample placed on the sample tray for measurement.

20 Claims, 8 Drawing Sheets

MICROMIRROR SPECTROPHOTOMETER ASSEMBLY

BACKGROUND

Spectrophotometers can be used to measure the intensity of light as a function of its wavelength over a spectral range of light (e.g., the spectral bandwidth of the spectrophotometer). For a spectrophotometer, important aspects of measurements include the absorption, transmittance, and reflectance of light by samples, for example, measured as a percentage or other gauge or metric. Spectrophotometers are often used to identify or determine the quality or quantity of solutions and solids based on the transmittance and reflectance characteristics of those samples.

BRIEF DESCRIPTION OF THE DRAWINGS

Aspects of the embodiments described herein can be better understood with reference to the following drawings. The elements in the drawings are not necessarily drawn to scale, with emphasis instead being placed upon clearly illustrating the principles of the embodiments. Additionally, certain dimensions or positionings can be exaggerated to help visually convey certain principles. In the drawings, similar reference numerals between figures designate like or corresponding, but not necessarily the same, elements.

DETAILED DESCRIPTION

According to aspects of the embodiments described herein, Digital Light Processing (DLP) Digital Micromirror Device (DMD) (DLP-DMD) technology is incorporated into a low-cost, commercial production spectrophotometer using an integral, singular-unit base platform or chassis assembly. The base platform or chassis assembly includes a number of optical assembly mounts. The base platform assembly facilitates the assembly of optics in a predetermined, pre-aligned spectrophotometer configuration for taking spectral measurements of various samples, including natural and synthetic food and agricultural products, among others. Features of the embodiments include a simple-to-use, pre-aligned optical and electronic base platform assembly, an automatic reference reflector, and a rotating sample tray. The embodiments can also rely upon spectral region measurement stitching, spectral and calibration transfer between instruments, and the alignment of spectra with specialized wavelength standards, photometric standards, and lineshape correction methods.

In one example described below, an instrument includes a diffraction grating to disperse broadband light over a range of wavelengths, a detector, a digital micromirror device (DMD) configured to scan through and reflect at least a portion of the range of wavelengths toward the detector, and a base platform having a number of integrally formed assembly mounts. The assembly mounts are formed to align and secure the diffraction grating, the detector, the DMD, and other optical components of the instrument in a predetermined arrangement. The instrument can also include a reference paddle having a reference material for calibration of the instrument, and a rotatable sample tray to rotate a sample placed on the sample tray for measurement.

Figure 1:
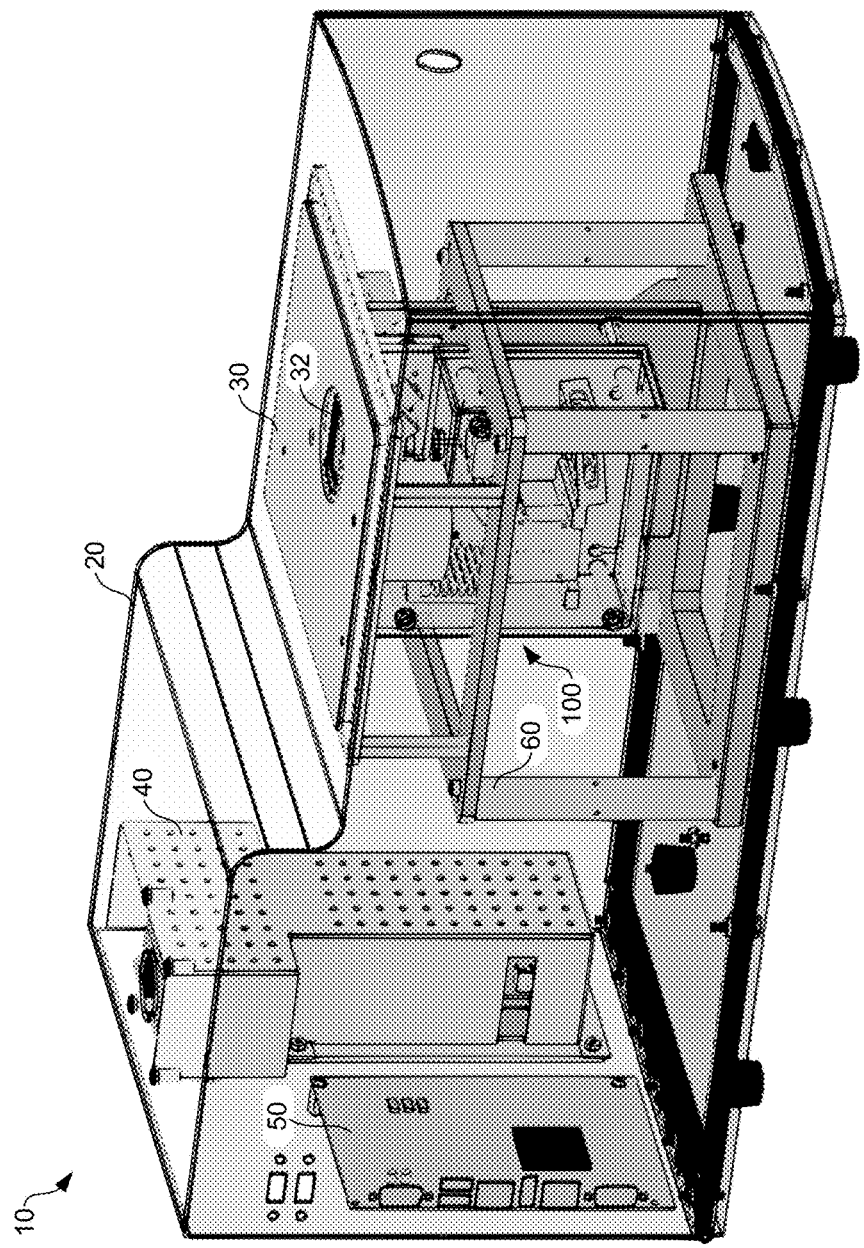
FIG. 1 illustrates an example spectrophotometer according to an embodiment described herein.

Turning to the drawings, FIG. 1 illustrates an example spectrophotometer 10 according to an embodiment described herein. Before continuing with a description of the spectrophotometer 10, it is noted that FIG. 1 is provided as a representative example for discussion. The example shown in FIG. 1 is not necessarily drawn to scale, does not exhaustively illustrate every part, piece, or component of the spectrophotometer 10, and is not intended to be limiting of the embodiments. Other arrangements of similar, additional, or fewer components can be used to achieve any number of the advantages described herein.

Among other components, the spectrophotometer 10 includes an enclosure 20, a sample platform 30 positioned at a top side of the enclosure 20, a power supply module 40, a computer control module 50, a support chassis 60, and a DLP-DMD measurement unit 100 ("measurement unit 100"). The measurement unit 100 is secured by the support chassis 60 within the enclosure 20.

The enclosure 20 can be embodied as any suitable case or enclosure, formed from plastic, metal, rubber, other materials, and/or combinations thereof, for enclosing and securing the components of the spectrophotometer 10. Similarly, the support chassis 60 within the enclosure 20 can be formed from plastic, metal, rubber, and other materials suitable for supporting and securing the measurement unit 100, the sample platform 30, and other components of the spectrophotometer 10, such as a monitor, keyboard, mouse, etc. Both the enclosure 20 and the support chassis 60 can be embodied as a number of parts and/or pieces secured together using any suitable means, such as mechanical interferences or joints, mechanical fasteners (e.g., screws, rivets, pins, interlocks), adhesives, etc.

At the top of the enclosure 20, the sample platform 30 includes a sample window 32 as shown in FIG. 1. As discussed in further detail below, samples for measurement by the spectrophotometer 10 can be placed in a sample cup, for example, and placed over the sample window 32 for measurement by the measurement unit 100 of the spectrophotometer 10 and analysis by the computer control module 50.

The power supply module 40 can be embodied as any suitable power supply (e.g., switch-mode, regulated, or other power supply) to provide power to the computer control module 50, the measurement unit 100, and other components of the spectrophotometer 10, such as stepper and/or servo motors, solenoids, relays, and fans, among other components. In that context, the power supply module 40 can convert power from line voltage to lower voltage direct current power suitable for components in the spectrophotometer 10.

The computer control module 50 can be embodied as one or more circuits, processors, processing circuits, memory devices, or any combination thereof configured to control components in the spectrophotometer 10. For example, the computer control module 50 can be configured to capture, store, and analyze data captured by a detector in the measurement unit 100, as described in further detail below. The computer control module 50 can also be configured to forward and/or display data to other computing or display device(s), receive control instructions or feedback through I/O interfaces (e.g., keyboards, keypads, touchpads, pointing devices) of the spectrophotometer 10, and store and process various types of data.

Figure 2:
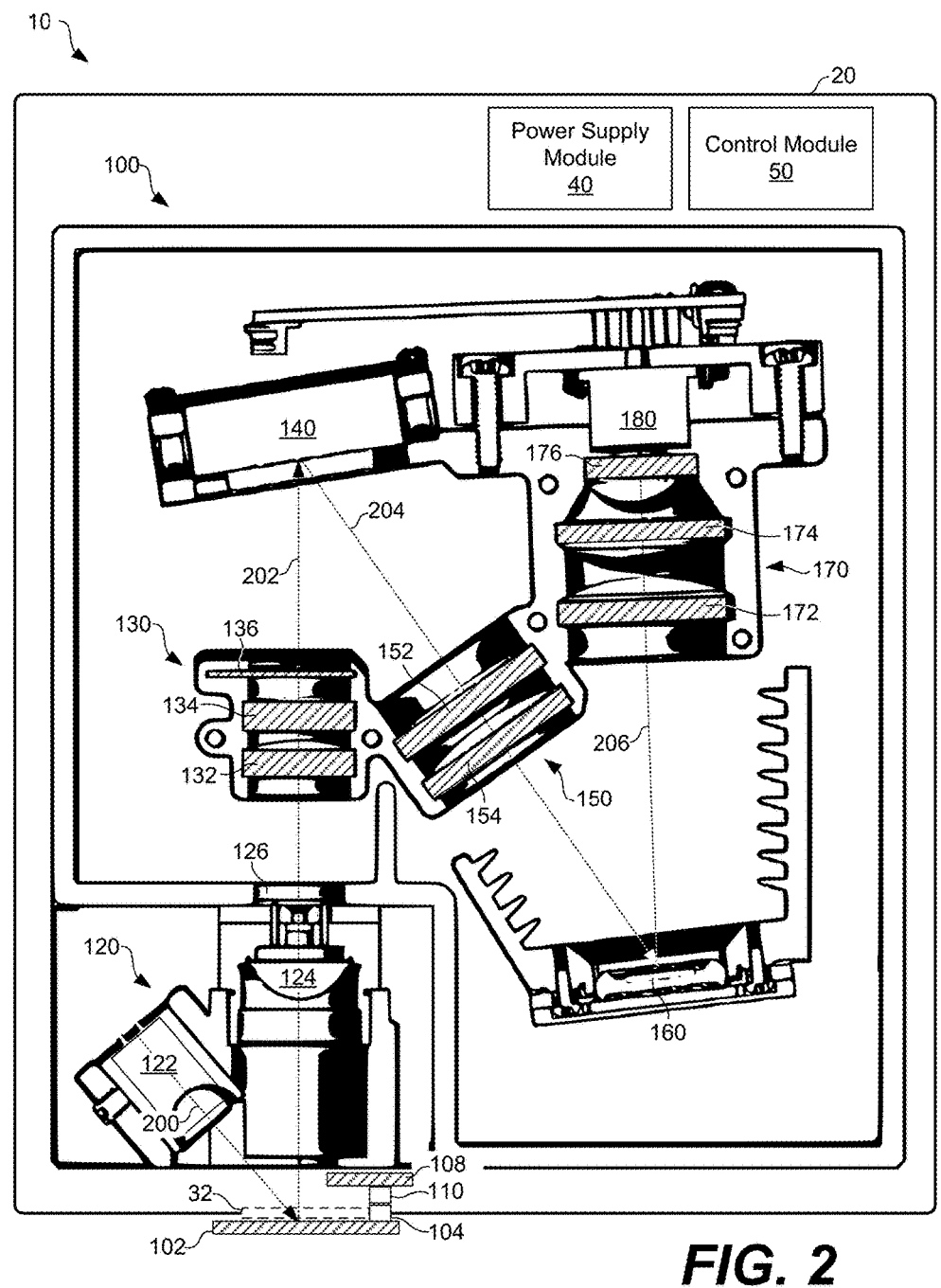
FIG. 2 illustrates a representative block diagram of the example spectrophotometer shown in FIG. 1 according to an embodiment described herein.

FIG. 2 illustrates a representative block diagram of the example spectrophotometer 10 shown in FIG. 1 according to an embodiment described herein. In FIG. 2, a number of components of the measurement unit 100 are shown. Additionally, a representative sample tray 102, sample tray drive motor 104, reference paddle 108, and reference paddle actuator 110 are shown. In the example shown in FIG. 2, the reference paddle 108 is positioned within the enclosure 20, and the sample tray 102 is positioned outside the enclosure 20. The representative sample tray 102, sample tray drive motor 104, reference paddle 108, and reference paddle actuator 110 are described in further detail below with reference to FIGS. 6A and 6B.

Among other components, the measurement unit 100 includes a light source assembly 120, an optical focusing assembly 130, a diffraction grating 140, another optical focusing assembly 150, a digital micromirror device (DMD) 160, an optical collimating assembly 170, and a detector 180. The light source assembly 120 includes a light source 122 and an entrance optics assembly 124.

The entrance optics assembly 124 is aligned with an entrance opening 126 in a cover of the measurement unit 100. During operation of the spectrophotometer 10, light from the light source 122 can travel along an optical pathway 200 in the light source assembly 120, through the sample window 32, and illuminate a sample placed on, in, or over the sample tray 102. Light reflected (and not absorbed) off the sample can travel along an optical pathway 202, through the entrance optics assembly 124, and through the entrance opening 126 in the cover of the measurement unit 100. The cover of the measurement unit 100 is described in further detail below with reference to FIG. 5.

In one embodiment, the light source 122 can include a halogen lamp or light bulb, although any source of broadband light suitable for the application can be relied upon among embodiments. The entrance optics assembly 124 can include optical elements that collimate light reflected off the sample, such as one or more spaced-apart expander and/or plano-convex lenses or other elements, without limitation. The entrance opening 126 can include a slit or other opening though which at least a portion of the light reflected off the sample can be passed through the cover of the measurement unit 100. In some cases, entrance opening 126 can be selectively covered and/or uncovered by a mechanical or electrical shutter (e.g., a liquid crystal, LCD, or similar device). The shutter can be actuated and controlled by the computer control module 50, for example, during various operations of the spectrophotometer 10, such as during dark scans, calibration or reference scans, and live scan operations, for example.

After passing through the entrance opening 126 along the optical pathway 202, light reflected off the sample can pass through the optical focusing assembly 130 to reach the diffraction grating 140. The optical focusing assembly 130 can include one or more spaced-apart lenses, such as the lenses 132 and 134 and the optical filter 136 (e.g., optical bandwidth filter) shown in FIG. 2. As described in further detail below with reference to FIGS. 3-5, the lenses 132 and 134 and optical bandpass filter 136 can be secured in an optical assembly mount of a base platform of the measurement unit 100.

The diffraction grating 140 can be embodied as a grating selected to disperse the light reflected off the sample into a range of wavelengths of light. For example, the diffraction grating 140 can disperse light over the ultra-violet (UV) to visible (VIS) range of wavelengths. In another case, the diffraction grating 140 can disperse light over the near-infrared (NIR) to infrared (IR) range of wavelengths. In various embodiments, the diffraction grating 140 can be selected to disperse light over any desired range of wavelengths.

The diffraction grating 140 can be embodied as substrates of various sizes with parallel grooves replicated on their surfaces, as would be appreciated in the art. The diffraction grating 140 disperses the light reflected off the sample by spatially separating it according to wavelength. Various methods of manufacture of diffraction gratings are known in the field, and the diffraction grating 140 can be manufactured using any known method, such as by replication from master gratings, interferometric control, holographic generation, ion etching, or lithography, for example. The diffraction grating 140 can also include a coating of reflective material over the grooves, to reflect light. The diffraction grating 140 can be sourced from any manufacturer of diffraction gratings, such as Optometrics Corporation of Littleton, Mass., Grating Works of Acton, Mass., or Richardson Gratings™ of Rochester, N.Y., for example, among others.

After being dispersed by the diffraction grating 140, the light reflected off the sample can travel through the optical focusing assembly 150 along the optical pathway 204 to reach the DMD 160. The optical focusing assembly 150 can include one or more spaced-apart lenses, such as the lenses 152 and 154 shown in FIG. 2. As described in further detail below with reference to FIGS. 3 and 4, the lenses 152 and 154 can be secured in an optical assembly mount of the base platform of the measurement unit 100.

The DMD 160 can be embodied as an array of hundreds of thousands to millions of micromirrors. The micromirrors of the DMD 160 can be controlled, respectively, by the computer control module 50 (and/or additional electronic components) to scan through and reflect at least a portion of the dispersed wavelengths of light from the diffraction grating 140 along the optical pathway 206 toward the detector 180. Using the DMD 160, one or more wavelengths or ranges of wavelengths can be reflected toward the detector 180 for measurement over time. Individual wavelengths or ranges of wavelengths can be selected over time (e.g., scanned) by the computer control module 50 by selectively turning columns of micromirrors in the DMD 160 on or off, to reflect desired wavelengths to the detector 180. The DMD 160 allows for the use of a high-performance detector 180, while providing wavelength selection agility and speed in the spectrophotometer 10. Further, the DMD 160 allows for mechanical stability in the spectrophotometer 10 because it is not necessary to pivot or rotate the diffraction grating 140 as compared to conventional techniques.

After being reflected by the DMD 160, the light reflected off the sample can travel through the optical collimating assembly 170 along the optical pathway 206 to reach the detector 180. The optical collimating assembly 170 can include one or more spaced-apart lenses, such as the lenses 172, 174, and 176 shown in FIG. 2. As described in further detail below with reference to FIGS. 3 and 4, the lenses 172 and 174 can be secured in an optical assembly mount of the base platform of the measurement unit 100.

The detector 180 is configured to measure the intensity of the light reflected off the sample (or the fraction of the light absorbed by the sample at specific wavelengths, i.e., the absorbance of the sample). The detector 180 further converts the light to one or more electrical signals for analysis by the computer control module 50. In the computer control module 50, the electrical signals can be converted (e.g., using one or more analog to digital converters) to data values from which a quantitative analysis of a variety of characteristics of the sample, including constituent analysis, moisture content, protein content, fat content, fiber content, amino acid content, taste, texture, viscosity, etc., can be determined. The optical detector 180 can include one or more charge-coupled device (CCD), indium gallium arsenide (InGaAs), or other ultraviolet through infrared image or light sensors that observe the reflection of light from the sample at one or more points of illumination. The field of view of the detector 180 can be restricted based on the relative geometry and/or placement of the lenses 172, 174, and 176 to maximize the collection of energy while minimizing the light inclusion of stray light.

Figure 3:
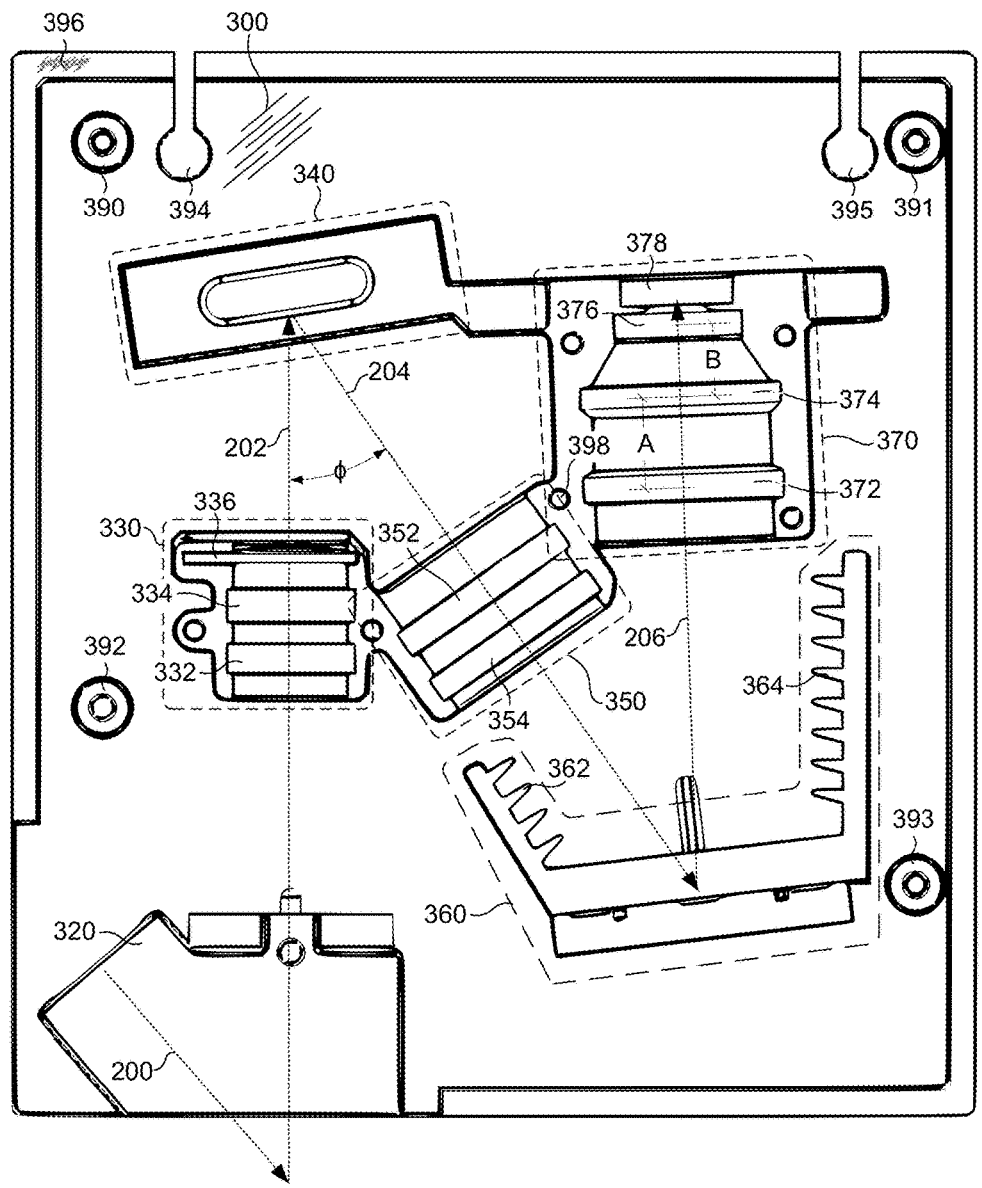
FIG. 3 illustrates a top-down view of a base platform of the measurement unit in the example spectrophotometer shown in FIG. 1 according to an embodiment described herein.
Figure 4:
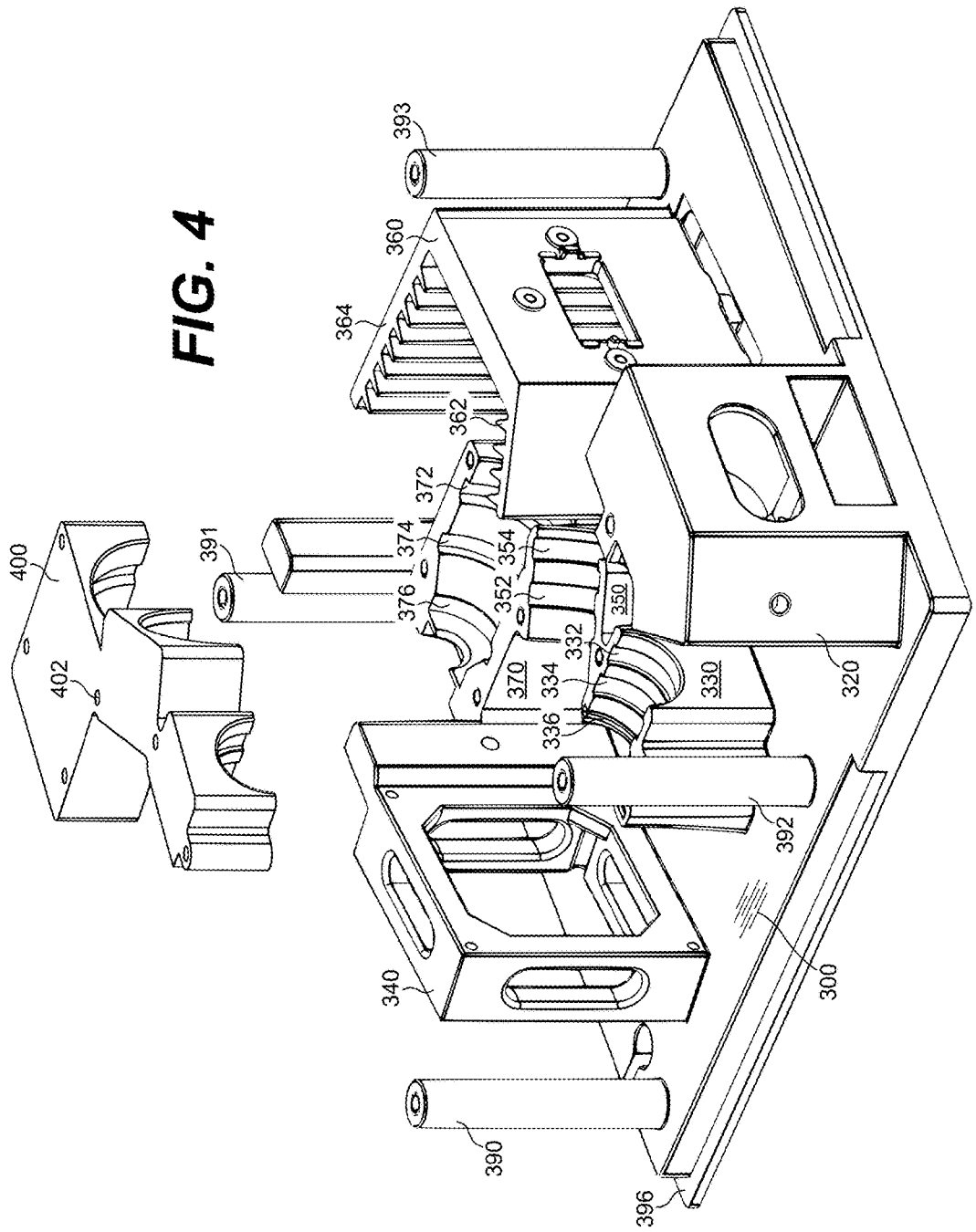
FIG. 4 illustrates a perspective view of the base platform of the measurement unit in the example spectrophotometer shown in FIG. 1 according to an embodiment described herein.

FIG. 3 illustrates a top-down view and FIG. 4 illustrates a perspective view of the base platform 300 of the measurement unit 100 in the example spectrophotometer 10 shown in FIG. 1. The embodiment of the base platform 300 shown in FIGS. 3 and 4 is provided as a representative example. In other cases, the base platform 300 can include other arrangements (and numbers) of assembly mounts and seats within the assembly mounts.

As shown in FIGS. 3 and 4, the base platform 300 includes a number of assembly mounts which are described in further detail below. A number of the assembly mounts are aligned along (and/or interfere with) one or more of the optical pathways 200, 202, 204, and 206. Some of the assembly mounts can be used to secure one or more lenses, optical filters, and/or other components in a predetermined, pre-aligned arrangement. Other assembly mounts can be used to secure one or more gratings, such as the diffraction grating 140, and electrical or optical-electrical components, such as the DMD 160 and the detector 180.

In one aspect of the embodiments, the base platform 300 can be formed as a single, integral unit. To that end, the base platform 300 can be formed using an additive manufacturing process. Additive manufacturing processes include those processes by which three-dimensional (3D) objects can be formed by adding layer-upon-layer of the same material. Additive manufacturing processes include many technologies including 3D printing, rapid prototyping (RP), direct digital manufacturing (DDM), layered manufacturing, and additive fabrication. The process can be conducted using any suitable material, such as a plastic or polymer (e.g., acrylonitrile butadiene styrene (ABS), nylon, plastic resin, etc.), poly-foam, Delrin®, metal, etc. In other approaches, the base platform 300 can be formed using other manufacturing processes, such as computer numerical control (CNC) machining and/or tooling processes, where material is removed from a larger workpiece.

During the additive manufacturing process, the assembly mounts of the base platform 300 can be formed to include a number of seats to secure one or more lenses, optical filters, and/or other components of the measurement unit 100 in a predetermined, pre-aligned arrangement. Starting with the base platform 300, the measurement unit 100 of the spectrophotometer 10 can be assembled relatively quickly and easily in a repeatable fashion. Specifically, each of the lenses, optical filters, and/or other components of the measurement unit 100 can be inserted and secured into a corresponding seat in an assembly mount of the base platform 300.

Each of the lenses, optical filters, and/or other components of the measurement unit 100 may take a different form, shape, and/or size. Thus, the seats for each of the components can, similarly, take a different form, shape, and/or size. In some cases, each of the components will fit into one and only one seat (and possibly in only one orientation) in the base platform 300. In that case, the measurement unit 100 of the spectrophotometer 10 can be assembled in only one way.

Referring between FIGS. 3 and 4, the base platform 300 includes the assembly mounts 320, 330, 340, 350, 360, and 370, for securing the light source assembly 120, the optical focusing assembly 130, the diffraction grating 140, the optical focusing assembly 150, the DMD 160, and the optical collimating assembly 170 and detector 180, respectively. As shown in FIG. 3, the assembly mounts 320, 330, and 340 are spaced along the optical pathways 200 and 202. The assembly mounts 340, 350 and 360 are spaced along the optical pathway 204. The assembly mounts 360, 370, and 380 are spaced along the optical pathway 206.

To assemble the measurement unit 100, the light source 122 and the entrance optics assembly 124 can be secured within the assembly mount 320 by sliding them into openings within the assembly mount 320 and securing them in place using mechanical interferences or joints, mechanical fasteners (e.g., screws, rivets, pins, interlocks), adhesives, etc. Similarly, the diffraction grating 140 can be secured within the assembly mount 340 by sliding it into the assembly mount 340 and securing it in place with any suitable means. The DMD 160 can also be secured within or to the assembly mount 360 by sliding it into the assembly mount 340 and securing it in place with any suitable means. As shown in FIGS. 3 and 4, the assembly mount 360 includes a number of baffles 362 and 364 to mitigate or block stray light within the measurement unit 100.

The lenses 132 and 134 and the optical filter 136 of the optical focusing assembly 130 can be placed and secured into the seats 332, 334, and 336 of the assembly mount 320. Similarly, the lenses 152 and 154 of the optical focusing assembly 150 can be placed and secured into the seats 352 and 354 of the assembly mount 350. The lenses 172, 174, and 176 of the optical collimating assembly 170 can also be placed and secured into the seats 372, 374, and 376 of the assembly mount 370. The detector 180 can be placed and secured into the seat 378 of the assembly mount 370.

The components (e.g., lenses, filters, mirrors, gratings, detectors, etc.) of the measurement unit 100 can be secured into the seats of the base platform 300 by being placed within and, in some cases, held in place by mechanical contact, foam spacers, adhesives, or other means. Further, after various components have been seated into the seats 332, 334, 336, 352, 354, 372, 374, and 376 of the assembly mounts 330, 350, 360, and 370, the assembly mounts 330, 350, 360 and 370 can be closed using one or more assembly mount covers, such as the assembly mount cover 400 shown in FIG. 4. The assembly mount cover 400 can include seats corresponding in size and position with the seats 332, 334, 336, 352, 354, 372, 374, and 376 of the assembly mounts 330, 350, and 370.

One or more of the assembly mounts 330, 350, and 370 can include holes (e.g., see reference 398 in FIG. 3), which can be threaded in some cases. The assembly mount cover 400 can also include holes, one of which is designated by reference 402 in FIG. 4. After various components have been seated into the assembly mounts 330, 350, 360, and 370, the assembly mount cover 400 can be placed over the assembly mounts 330, 350, and 370. Among other fasteners, a mechanical fastener, such as a screw, can be passed through the hole 402 of the assembly mount cover 400 and threaded into the hole 398 (see FIG. 3) of the assembly mount 350 for securing the assembly mount cover 400 over the assembly mounts 330, 350, and 370.

In one example case, each of the seats 332, 334, 336, 352, 354, 372, 374, and 376 is formed to have a predetermined size (e.g., length, width, height, radius of curvature, etc.) for a particular one of the components of the measurement unit 100. Further, the placement of each of the components can be predetermined in a particular spaced-apart arrangement defined by the base platform 300 with respect to one or more of the optical pathways 200, 202, 204, and 206. For example, as shown in FIG. 3, the seats 372 and 374 are spaced apart by the distance "A" along the optical pathway 206, and the seats 374 and 376 are spaced apart by the distance "B" along the optical pathway 206. In other embodiments, any of the seats shown in FIGS. 3 and 4 can be spaced-apart by other distances depending upon the types and arrangements of the components of the measurement unit 100.

Again, once the base platform 300 is formed, the measurement unit 100 can be assembled relatively quickly and easily as each of the lenses, optical filters, and other components of the measurement unit 100 can be inserted and secured into a corresponding assembly mount and/or seat of the base platform 300. In some cases, each of the components will fit into one and only one assembly mount and/or seat (and possibly in only one orientation) in the base platform 300. In that case, the measurement unit 100 of the spectrophotometer 10 can be assembled in only one way. As compared to conventional techniques without the use of a base platform as described herein, it can be relatively time consuming and difficult to ensure that all the components of a spectrophotometer are aligned properly.

The base platform 300 also includes number of standoffs 390-393 and eyelets 394 and 395 as shown in FIG. 3. As described in further detail below with reference to FIG. 5, a cover can be mounted over the base platform 300, seated into and against the channel 396 along a length of the bottom edge of the base platform 300, and secured against the top ends of the standoffs 390-393 using screws or other mechanical fastening means. When the measurement unit 100 is fully assembled and the cover of the base platform 300 is secured, the measurement unit 100 can be secured to the support chassis 60 within the enclosure 20 of the spectrophotometer 10 as shown in FIG. 1. The eyelets 394 and 395 can be used to pass wiring assemblies, harnesses, etc. between the components inside the measurement unit 100, the power supply module 40, and the computer control module 50.

Before turning to FIG. 5, it is again noted that the base platform 300 illustrated in FIGS. 3 and 4 is provided as a representative example. Other base platforms for other instruments can include other numbers and arrangements of assembly mounts. In that sense, other base platforms can include assembly mounts aligned along optical pathways other than those shown in FIGS. 3 and 4. For example, although the optical pathways 202 and 206 extend parallel to each other, and the optical pathway 202 extends at an angle φ with respect to the optical pathway 204, assembly mounts can be formed at other positions in a base platform for alignment to other optical pathways at other angles with respect to each other in any suitable manner.

Figure 5:
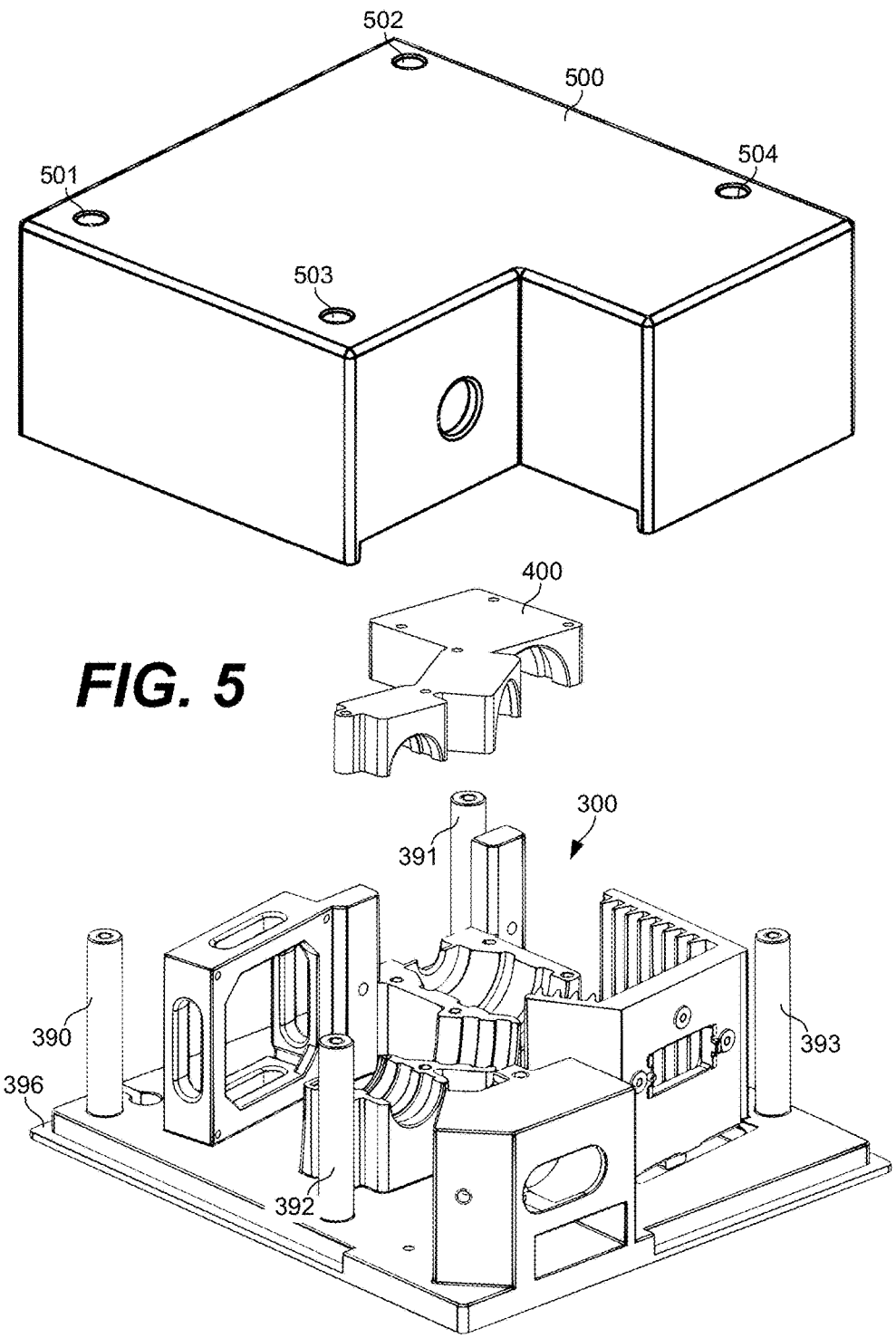
FIG. 5 illustrates a perspective view of the base platform, assembly mount cover of the base platform, and cover of the measurement unit in the example spectrophotometer shown in FIG. 1 according to an embodiment described herein.

FIG. 5 illustrates a perspective view of the base platform 300, assembly mount cover 400 of the base platform 300, and cover 500 of the measurement unit 100 in the example spectrophotometer 10 shown in FIG. 1. As described above, the base platform 300 includes a number of standoffs 390-393. After the assembly mount cover 400 is secured to the base platform 300, the cover 500 can be mounted over the base platform 300, seated into and against the channel 396 along a length of the bottom edge of the base platform 300, and secured against the top ends of the standoffs 390-393 using screws or other mechanical fastening means passed through holes 501-504 in the cover 500. When the measurement unit 100 is fully assembled and the cover 500 of the base platform 300 is secured, the measurement unit 100 can be secured to the support chassis 60 within the enclosure 20 of the spectrophotometer 10.

Figure 6A:
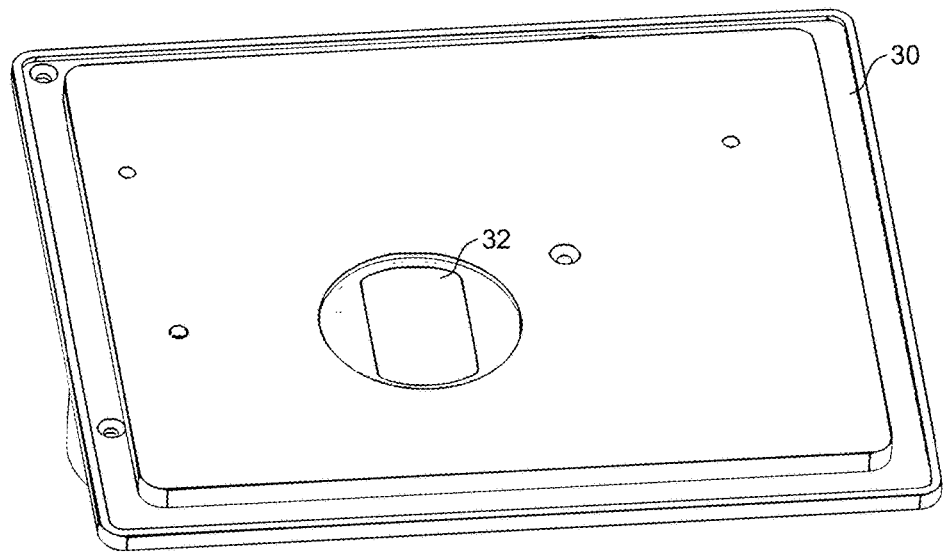
FIGS. 6A and 6B, respectively, illustrate top and bottom views of a sample platform of the example spectrophotometer shown in FIG. 1 according to an embodiment described herein.
Figure 6B:
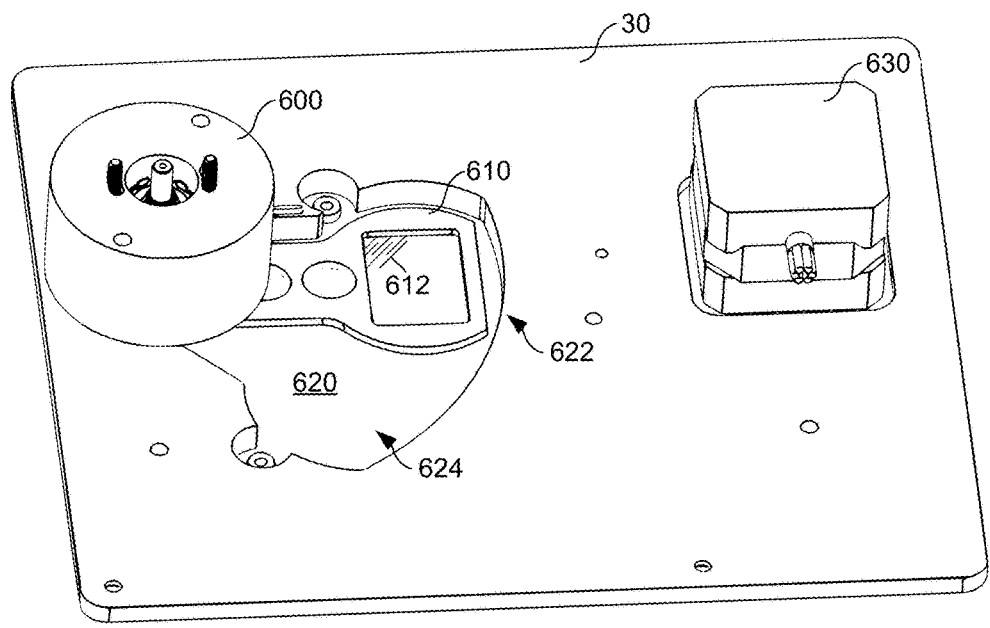

FIGS. 6A and 6B, respectively, illustrate top and bottom views of a sample platform 30 of the example spectrophotometer 10 shown in FIG. 1. As shown in FIG. 6A, the sample platform includes the sample window 32. Light from the light source assembly 120 can pass through the sample window 32 and exit the enclosure 20 of the spectrophotometer 10 along optical pathway 200 (FIG. 2). As also described in further detail below with reference to FIG. 7, light that passes through the sample window 32 can illuminate a sample placed on, in, or over the sample tray 102 above the sample window 32. Light reflected (and not absorbed) off the sample can travel back through the sample window 32 and into the measurement unit 100.

Referring to FIG. 6B, a motor 600 is secured to the bottom side of the sample platform 30. A stepper or servo motor 630 is also secured to the bottom side of the sample platform 30. As described in further detail below with reference to FIG. 7, the computer control module 50 can also control the servo motor 630 to rotate a sample tray 102 placed over the sample window 32 in the sample platform 30.

A reference paddle 610 is mechanically secured to a shaft of the motor 600. When assembled with the motor 600 to the sample platform 30, the reference paddle 610 occupies a recess 620 in the bottom of the sample platform 30. The computer control module 50 can control the motor 600 to rotate the reference paddle 610 between a first position 622 in the recess 620 and a second position 624 in the recess 620.

In the first position 622 shown in FIG. 6B, the reference paddle 610 covers the sample window 32. As such, it interferes with the optical pathway 200 (FIG. 2). In the first position 622, light from the light source assembly 120 falls upon and is reflected off of the reference paddle 610 rather than passing through the sample window 32. The reference paddle 610 includes a recessed area 612 for a reflective reference material. In one embodiment, the recessed area 612 can be covered in gold plating reflective reference material for calibration of the spectrophotometer 10. In other embodiments, the recessed plating area 612 can be covered or plated using other reference materials, such as polytetrafluoroethylene (PTFE), teflon, reflective metal(s), or a diffuse mirrored surface material, among others.

Figure 7:
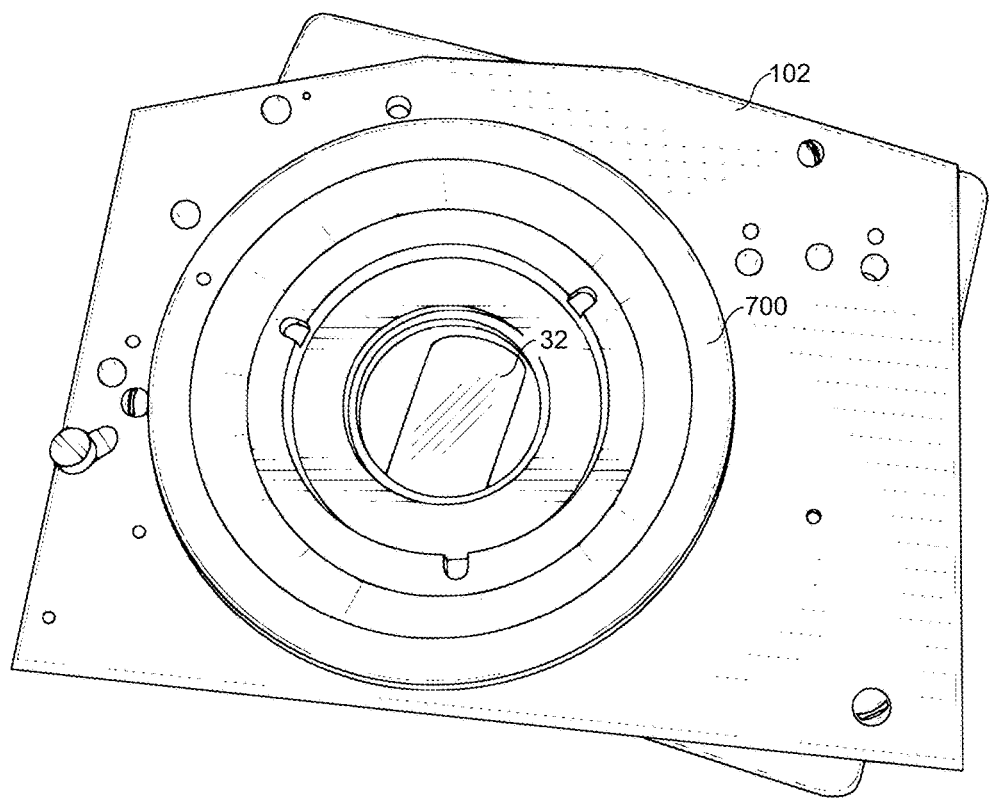
FIG. 7 illustrates a sample tray of the example spectrophotometer shown in FIG. 1 according to an embodiment described herein.

FIG. 7 illustrates the sample tray 102 of the example spectrophotometer 10 shown in FIG. 1. The sample tray 102 is mechanically coupled to a shaft of the stepper or servo motor 630 (FIG. 6B) through the sample platform 30, and the computer control module 50 can also control the servo motor 630 to rotate the sample tray 102. Thus, the sample tray 102 can be rotated at the direction of the computer control module 50.

The sample tray 102 includes a sample cup adapter 700 mounted and secured thereto. As shown in FIG. 7, the sample cup adapter 700 is mounted to the sample tray 102 above the sample window 32. When a sample for measurement is placed in or on the sample cup adapter 700, possibly in a sample cup or other fixture, it can be rotated. In other words, sample cup adapter 700 can be rotated along with the sample tray 102 using the stepper or servo motor 630. The sample cup adapter 700 can be rotated at different (or variable) speeds, for example, from a few degrees per second to about 180 degrees per second based on control provided by the computer control module 50.

By rotating the sample during measurements taken by the spectrophotometer 10, measurements can be taken in a more representative and/or comprehensive manner because light can be reflected (or absorbed) off the sample at different times or over time from different positions or orientations of the sample.

In some embodiments, one or more aspects of spectral region measurement stitching, spectral and calibration transfer between instruments, and the alignment of spectra with specialized wavelength standards, photometric standards, and lineshape correction methods can be incorporated into the spectrophotometer 10. For example, the aspects described in any of U.S. patent application Ser. No. 13/829,651, titled "SPECTROMETER SECONDARY REFERENCE CALIBRATION"; U.S. patent application Ser. No. 14/600,454, titled "SPECTROMETER REFERENCE CALIBRATION"; U.S. Pat. No. 9,404,799, titled "TANDEM DISPERSIVE RANGE MONOCHROMATOR"; or U.S. patent application Ser. No. 15/416,552, titled "DATA BLENDING MULITPLE DISPERSIVE RANGE MONOCHROMATOR" can be incorporated into the spectrophotometer 10. The entire disclosures of each of U.S. patent application Ser. No. 13/829,651; U.S. patent application Ser. No. 14/600,454; U.S. Pat. No. 9,404,799; and U.S. patent application Ser. No. 15/416,552, titled "DATA BLENDING MULITPLE DISPERSIVE RANGE MONOCHROMATOR" are hereby incorporated herein by reference.

Figure 8:
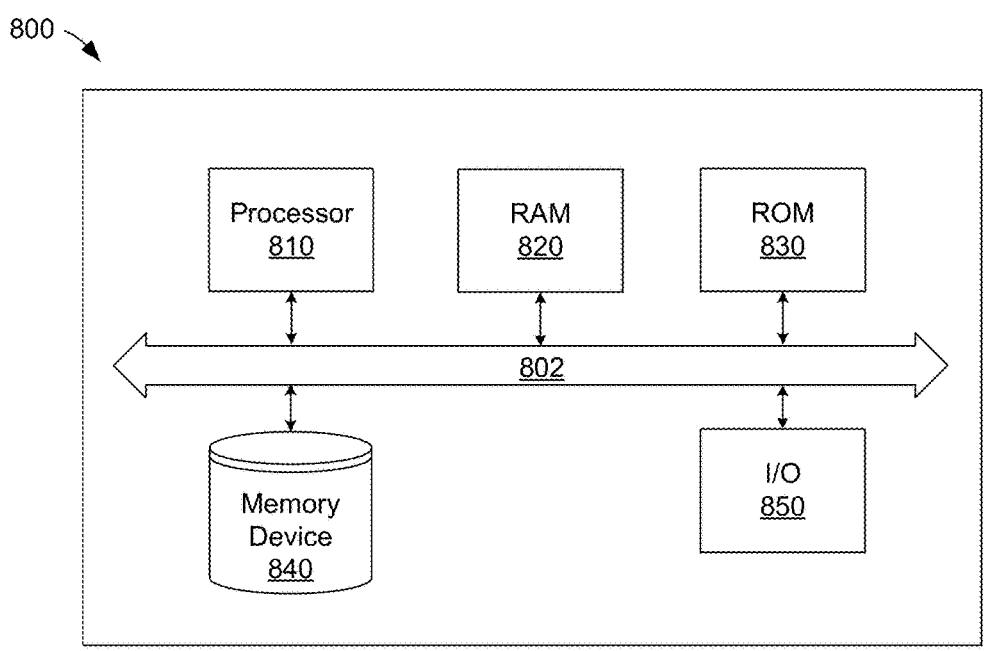
FIG. 8 illustrates an example schematic block diagram of processing circuitry which can be employed in the spectrophotometer shown in FIG. 1 according to an embodiment described herein.

FIG. 8 illustrates an example schematic block diagram of processing circuitry which can be employed as the computer control module 50 in the spectrophotometer 10 shown in FIG. 1 according to an embodiment described herein. The processing circuitry 800 can be embodied, in part, using one or more elements of a general purpose or specialized embedded computer. The processing circuitry 800 includes a processor 810, a Random Access Memory (RAM) 820, a Read Only Memory (ROM) 830, a memory device 840, and an Input Output ("I/O") interface 850. The elements of the processing circuitry 800 are communicatively coupled via a local interface 802. The elements of the processing circuitry 800 described herein are not intended to be limiting in nature, and the processing circuitry 800 can include other elements.

In various embodiments, the processor 810 can comprise any well-known general purpose arithmetic processor, programmable logic device, state machine, or Application Specific Integrated Circuit (ASIC), for example. The processor 810 can include one or more circuits, one or more microprocessors, ASICs, dedicated hardware, or any combination thereof. In certain aspects embodiments, the processor 810 is configured to execute one or more software modules. The processor 810 can further include memory configured to store instructions and/or code to various functions, as further described herein. In certain embodiments, the processor 810 can comprise a general purpose, state machine, or ASIC processor, and various processes can be implemented or executed by the general purpose, state machine, or ASIC processor according software execution, by firmware, or a combination of a software execution and firmware.

The RAM and ROM 820 and 830 can comprise any well-known random access and read only memory devices that store computer-readable instructions to be executed by the processor 810. The memory device 840 stores computer-readable instructions thereon that, when executed by the processor 810, direct the processor 810 to direct the spectrophotometer 10 to perform various aspects of the embodiments described herein.

As a non-limiting example group, the memory device 840 can comprise one or more non-transitory devices or mediums including an optical disc, a magnetic disc, a semiconductor memory (i.e., a semiconductor, floating gate, or similar flash based memory), MLC Negative-AND-based flash memory, a magnetic tape memory, a removable memory, combinations thereof, or any other known memory means for storing computer-readable instructions. The I/O interface 850 can comprise device input and output interfaces such as keyboard, pointing device, display, communication, and/or other interfaces, such as a network interface, for example. The local interface 802 electrically and communicatively couples the processor 810, the RAM 820, the ROM 830, the memory device 840, and the I/O interface 850, so that data and instructions can be communicated among them.

In certain aspects, the processor 810 is configured to retrieve computer-readable instructions and data stored on the memory device 840, the RAM 820, the ROM 830, and/or other storage means, and copy the computer-readable instructions to the RAM 820 or the ROM 830 for execution, for example. The processor 810 is further configured to execute the computer-readable instructions to implement various aspects and features of the embodiments described herein.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

At least the following is claimed:

1. An instrument, comprising:
 a diffraction grating to disperse broadband light over a range of wavelengths;
 a detector;
 a digital micromirror device (DMD) configured to scan through and reflect at least a portion of the range of wavelengths toward the detector; and
 a plurality of assembly mounts integrally formed as a base platform to align and secure the diffraction grating, the detector, the DMD, and a plurality of optical components of the instrument in a predetermined arrangement, wherein:
the plurality of the assembly mounts comprise a plurality of integral seats to align and secure the plurality of optical components of the instrument in a predetermined arrangement relative to each other and the diffraction grating, the detector, and the DMD; and
the plurality of integral seats are individually separated by a predetermined spacing along at least one optical pathway in the instrument.

2. The instrument of claim 1, wherein at least one of the plurality of assembly mounts comprises:
a first integral seat formed for a first optical component of a focusing optics assembly; and
a second integral seat for a second optical component of the focusing optics assembly, the first integral seat and the second integral seat being separated by a predetermined spacing along an optical pathway that extends along the at least one of the plurality of assembly mounts.

3. The instrument of claim 1, wherein:
a first of the plurality of assembly mounts is aligned along a first optical pathway in the instrument;
a second of the plurality of assembly mounts is aligned along a second optical pathway parallel to the first optical pathway in the instrument; and
a third of the plurality of assembly mounts is aligned along a third optical pathway at an angle with respect to at least one of the first optical pathway and the second optical pathway in the instrument.

4. The instrument of claim 3, wherein:
the plurality of optical components are aligned and secured in the first, second, and third of the plurality of assembly mounts; and
an assembly mount cover is secured over the first, second, and third of the plurality of assembly mounts.

5. The instrument of claim 3, wherein a fourth of the plurality of assembly mounts is aligned at one end of the first optical pathway to secure a light source and an entrance optics assembly of the instrument.

6. The instrument of claim 5, wherein a fifth of the plurality of assembly mounts is positioned about an intersection of the first optical pathway and the second optical pathway to secure the diffraction grating.

7. The instrument of claim 6, wherein:
a sixth of the plurality of assembly mounts is positioned about an intersection of the second optical pathway and the third optical pathway to secure the DMD; and
the sixth of the plurality of assembly mounts includes a number of baffles integral to the base platform.

8. The instrument of claim 1, wherein the base platform is continuously formed from a single material using an additive manufacturing process.

9. The instrument of claim 1, further comprising:
a motor comprising a shaft; and
a reference paddle mechanically coupled to the shaft of the motor, wherein:
the reference paddle includes a reference material for calibration of the instrument; and
the motor is configured to rotate the reference paddle to cover a sample window of the instrument for calibration of the instrument.

10. The instrument of claim 1, further comprising:
a motor comprising a shaft that extends through a sample platform 30 of the instrument; and a sample tray mechanically coupled to the shaft of the motor, wherein the motor is configured to rotate a sample placed on the sample tray for measurement.

11. A method of assembly for an instrument, comprising:
forming a base platform comprising a plurality of integral assembly mounts;
securing a diffraction grating in a first of the plurality of integral assembly mounts;
securing a digital micromirror device (DMD) in a second of the plurality of integral assembly mounts;
securing a detector in a third of the plurality of integral assembly mounts; and
seating at least one optical component of the instrument in a fourth of the plurality of integral assembly mounts, wherein the diffraction grating, the DMD, the detector, and the at least one optical component are aligned and secured in a predetermined arrangement based on relative positions of the plurality of integral assembly mounts of the base platform.

12. The method of assembly for the instrument of claim 11, further comprising installing a cover over the base platform.

13. The method of assembly for the instrument of claim 11, further comprising installing an assembly mount cover over the fourth of the plurality of integral assembly mounts.

14. The method of assembly for the instrument of claim 11, wherein:
the first of the plurality of integral assembly mounts is aligned along a first optical pathway in the instrument; and
the second of the plurality of integral assembly mounts is aligned along a second optical pathway parallel to the first optical pathway in the instrument.

15. The method of assembly for the instrument of claim 11, wherein forming the base platform comprises forming the base platform using an additive manufacturing process.

16. An instrument, comprising:
a diffraction grating to disperse broadband light over a range of wavelengths;
a detector;
a digital micromirror device (DMD) configured to scan through and reflect at least a portion of the range of wavelengths toward the detector; and
a plurality of assembly mounts integrally formed as a base platform to align and secure the diffraction grating, the detector, the DMD, and at least one optical component of the instrument in a predetermined arrangement.

17. The instrument of claim 16, wherein at least one of the plurality of the assembly mounts comprises a seat to align and secure the at least one optical component of the instrument in a predetermined arrangement relative to the diffraction grating, the detector, and the DMD.

18. The instrument of claim 17, wherein the at least one of the plurality of the assembly mounts comprises:
a first integral seat formed for a first optical component of an optics assembly; and
a second integral seat for a second optical component of the optics assembly, the first integral seat and the second integral seat being separated by a predetermined spacing along an optical pathway in the instrument.

19. The instrument of claim 16, wherein the base platform is continuously formed from a single material using an additive manufacturing process.

20. The instrument of claim 1, further comprising:
a motor comprising a shaft; and
a reference paddle mechanically coupled to the shaft of the motor, wherein:

the reference paddle includes a reference material for calibration of the instrument; and the motor is configured to rotate the reference paddle to cover a sample window of the instrument for calibration of the instrument.

* * * * *